(12) United States Patent
Oe et al.

(10) Patent No.: US 7,874,200 B2
(45) Date of Patent: Jan. 25, 2011

(54) INTERNAL COMBUSTION ENGINE KNOCK DETERMINATION DEVICE

(75) Inventors: Shuhei Oe, Kariya (JP); Kiyoshi Iwade, Okazaki (JP); Nobuyuki Murate, Okazaki (JP); Rihito Kaneko, Nishikamo-gun (JP); Yuichi Takemura, Anjo (JP); Shigeru Kamio, Nagoya (JP)

(73) Assignees: Toyota Jidosha Kabushiki Kaisha, Toyota-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 0 days.

(21) Appl. No.: 12/163,342

(22) Filed: Jun. 27, 2008

(65) Prior Publication Data
US 2008/0264150 A1 Oct. 30, 2008

Related U.S. Application Data

(62) Division of application No. 11/410,983, filed on Apr. 26, 2006, now Pat. No. 7,412,874.

(30) Foreign Application Priority Data
Apr. 27, 2005 (JP) ............................ 2005-130005

(51) Int. Cl.
 *G01L 23/22* (2006.01)
(52) U.S. Cl. .................................. 73/35.09
(58) Field of Classification Search .............. 73/35.09, 73/35.07, 35.02, 35.01, 654; 123/406.33, 123/406.37, 406.38, 406.39, 406.21, 406.29, 123/406.15
See application file for complete search history.

(56) References Cited

U.S. PATENT DOCUMENTS

| | | | | |
|---|---|---|---|---|
| 3,809,027 | A | * 5/1974 | Morgan | 123/251 |
| 4,371,804 | A | * 2/1983 | Peng et al. | 310/321 |
| 4,408,479 | A | 10/1983 | Asai et al. | |
| 4,483,179 | A | 11/1984 | Oshima et al. | |
| 4,660,517 | A | 4/1987 | Fujimoto et al. | |

(Continued)

FOREIGN PATENT DOCUMENTS

DE 42 23 649 A1 1/1993

(Continued)

OTHER PUBLICATIONS

A.M. Zoubir, et al., "Tests for Optimizing Sensor Positions Using Linear Regression", Signal Processing, XP-000348487, Aug. 24, 1992, pp. 641-644.

(Continued)

*Primary Examiner*—Helen C. Kwok
(74) *Attorney, Agent, or Firm*—Oblon, Spivak, McClelland, Maier & Neustadt, L.L.P.

(57) ABSTRACT

An engine ECU executes a program including the steps of: detecting a vibration corresponding to a first radial resonance mode by using a band-pass filter, from vibrations sensed by an in-cylinder pressure sensor provided at an upper central portion of the cylinder; calculating knock intensity N based on a result of comparison between the detected waveform and a knock waveform model prepared in advance as a vibration waveform when knocking occurs; determining that knocking occurred when the knock intensity N is larger than a predetermined reference value; and determining that knocking has not occurred when the knock intensity N is not larger than the predetermined reference value.

11 Claims, 12 Drawing Sheets

U.S. PATENT DOCUMENTS

| | | | |
|---|---|---|---|
| 4,991,553 A * | 2/1991 | Kurihara et al. | 123/406.37 |
| 5,373,448 A * | 12/1994 | Katogi et al. | 701/111 |
| 6,688,286 B2 * | 2/2004 | Kokubo et al. | 123/406.33 |
| 2002/0179053 A1 | 12/2002 | Kokubo et al. | |

FOREIGN PATENT DOCUMENTS

| | | |
|---|---|---|
| EP | 0 392 804 A2 | 10/1990 |
| EP | 0 632 261 A2 | 1/1995 |
| EP | 0 889 309 A1 | 1/1999 |
| JP | 60-4824 | 1/1985 |
| JP | 60-204969 | 10/1985 |
| JP | 1-148924 | 6/1989 |
| JP | 4-194711 | 7/1992 |
| JP | 2001-227400 | 8/2001 |
| JP | 2003-21032 | 1/2003 |
| JP | 2005-23902 | 1/2005 |

OTHER PUBLICATIONS

Robert Hickling, et al., "Cavity resonances in engine combustion chambers and some applications", Journal of the Acoustical Society of America, vol. 73, No. 4, XP-002171060, Apr. 1983, pp. 1170-1178.

* cited by examiner

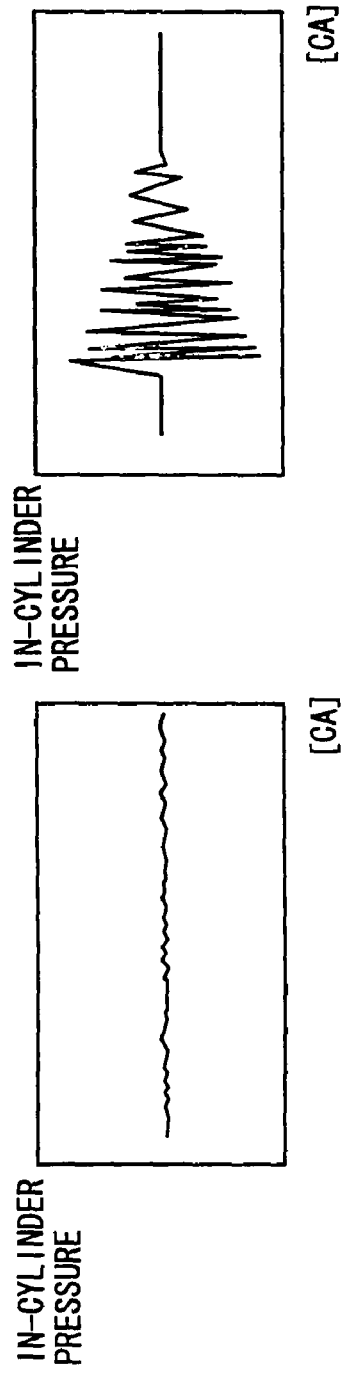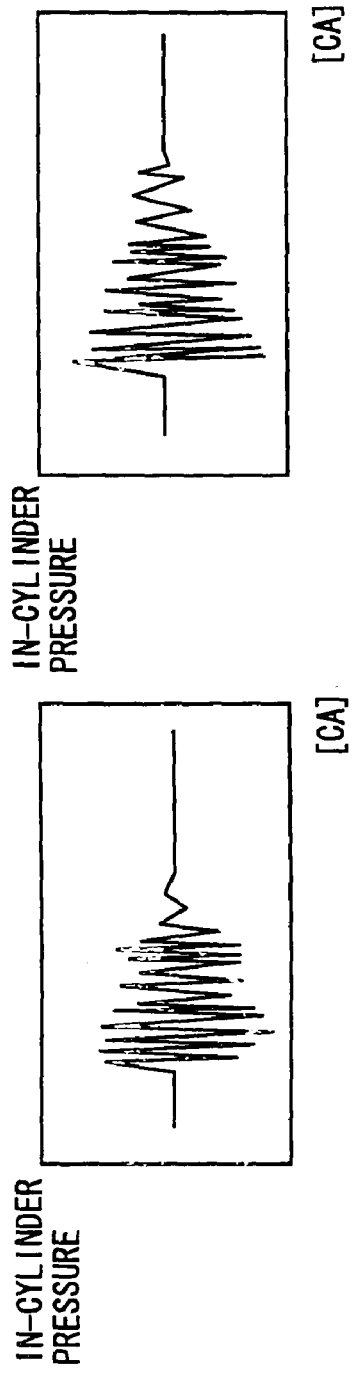

FIG. 3

| NODE | (TANGENTIAL ORDER, RADIAL ORDER) | THEORETICAL FREQUENCY |
|---|---|---|
| | (1, 0) | f(1) |
| | (2, 0) | f(2) |
| | (0, 1) | f(3) |
| | (3, 0) | f(4) |
| | (4, 0) | f(5) |
| | (1, 1) | f(6) |

F I G. 1 0
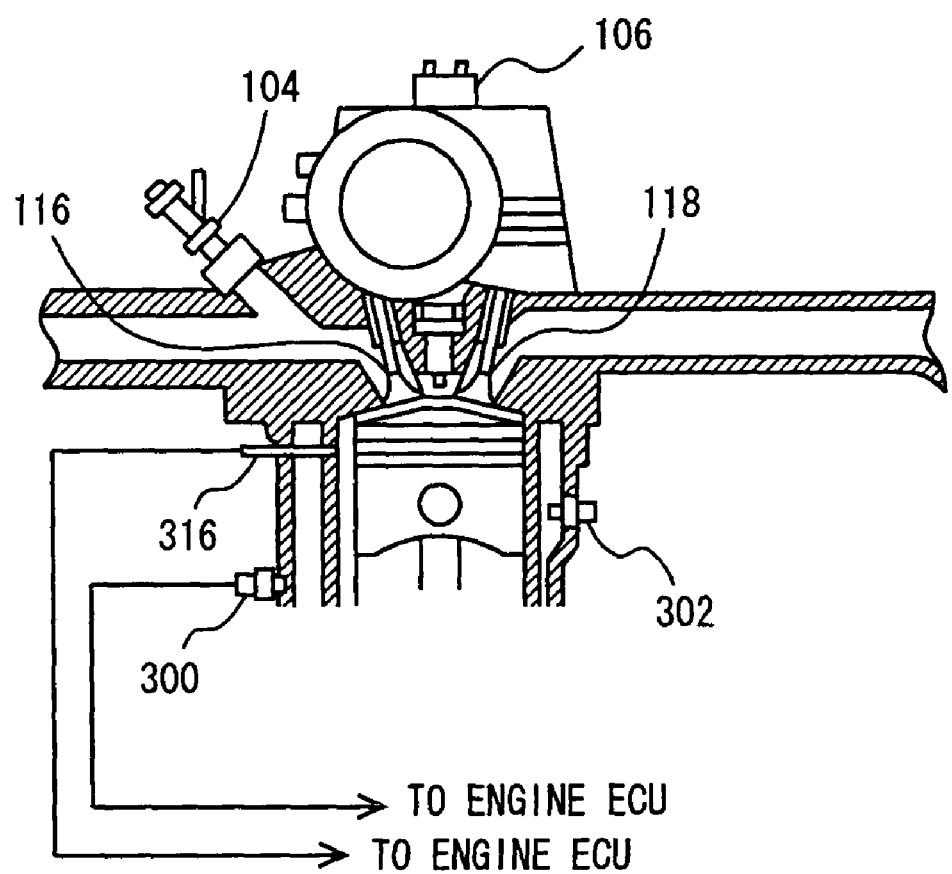

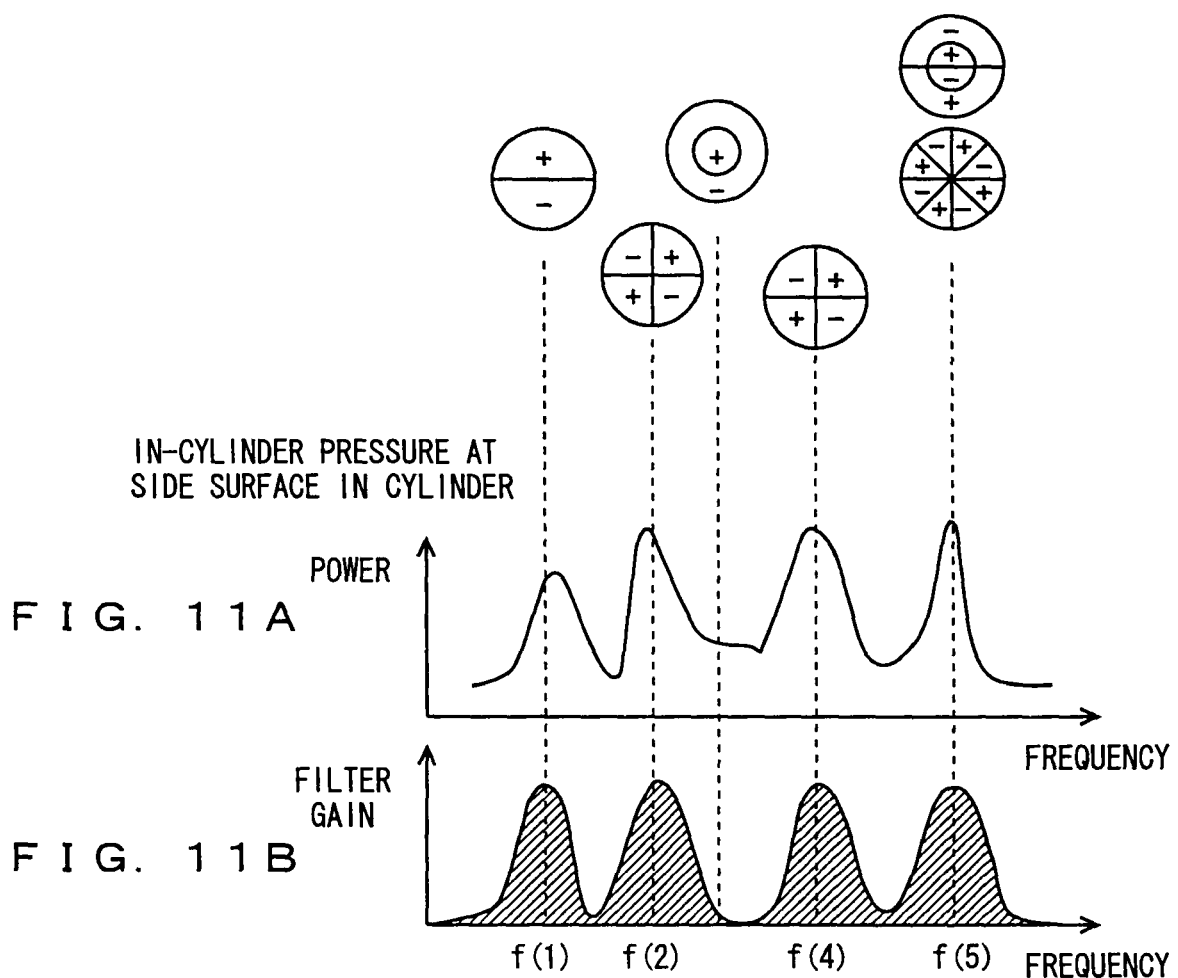

INTERNAL COMBUSTION ENGINE KNOCK DETERMINATION DEVICE

This present application is a Divisional Application of U.S. Ser. No. 11/410,983, filed Apr. 26, 2006, and is based on Japanese Patent Application No. 2005-130005 filed with the Japan Patent Office on Apr. 27, 2005, which is hereby incorporated herein by reference in its entirety.

BACKGROUND OF THE INVENTION

1. Field of the Invention

The present invention relates to a knocking determination device and, more specifically, to a knocking determination device for an internal combustion engine that determines whether knocking occurs or not, based on vibration waveform of the internal combustion engine.

2. Description of the Background Art

Conventionally, a technique for detecting knocking of an internal combustion engine is known. Japanese Patent Laying-Open No. 2001-227400 discloses a knock control device for an internal combustion engine that can accurately determine whether the engine knocks. The knock control device for an internal combustion engine includes a signal detector detecting a signal representing a waveform of vibration occurring in the internal combustion engine (or a vibration waveform signal), an occurrence period detector detecting a period as an occurrence period during which the vibration waveform signal detected by the signal detector assumes a predetermined value or higher, a peak position detector detecting a peak position in the occurrence period detected by the occurrence period detector, a knock determiner determining whether the internal combustion engine knocks based on the relation between the occurrence period and the peak position, and a knock controller controlling an operation state of the internal combustion engine in accordance with a determination result of the knock determiner. The knock determiner determines knock (knocking) occurs when the peak position relative to the occurrence period is in a predetermined range.

According to the knock control device for an internal combustion engine disclosed in the publication, a signal representing a waveform of vibration occurring in the internal combustion engine is detected by a signal detector. An occurrence period during which the vibration waveform signal assumes a predetermined value or higher and a peak position therein are detected by an occurrence period detector and a peak position detector, respectively. Thus, the knock determiner can determine whether the engine knocks by detecting the position of the peak in the occurrence period of the vibration waveform signal. According to the knock determination result, the operation state of the internal combustion engine is controlled. When the peak position relative to the occurrence period is in a predetermined range, that is, when a waveform has such a shape that the peak position appears earlier relative to a predetermined length of the occurrence period of the vibration waveform signal, the knock determiner recognizes it as being particular to knocking. Thus, even in a transition state where an operation state of the internal combustion engine abruptly changes or when electric loads are turned on/off, whether or not the internal combustion engine knocks is accurately determined, and the operation state of the internal combustion engine can be controlled appropriately.

However, while the engine knocks, a vibration that is greater in magnitude than a vibration attributed to knocking may sometimes be detected as noise. That is, in some cases a vibration attributed to a fault of a knock sensor or attributed to a vibration of the internal combustion engine itself may be greater in magnitude than a vibration attributed to knocking. In such cases, with the knock control device for an internal combustion engine of Japanese Patent Laying-Open No. 2001-227400, there has been a problem that the engine is erroneously determined as not knocking while the engine actually knocks, based on the fact that the peak position relative to the occurrence period is not within a predetermined range.

SUMMARY OF THE INVENTION

An object of the present invention is to provide a knock determination device that can determine whether the engine knocks with high accuracy.

According to an aspect, the present invention provides a knocking determination device for determining knocking of an internal combustion engine. The knocking determination device includes: a detecting unit provided at a detection position corresponding to either one of resonance modes including a tangential mode and a radial mode as resonance modes of combustion pressure propagation in a cylinder of the internal combustion engine, and detecting vibrations derived from combustion of the internal combustion engine including a vibration corresponding to the resonance mode; and a determining unit determining whether knocking occurred in the internal combustion engine or not, based on the detected vibrations.

According to the present invention, the detecting unit is provided at a detection position (such as an upper central portion of the cylinder) that corresponds to either one of the resonance modes, that is, the tangential mode and the radial mode, which are resonance modes of combustion pressure propagation in the cylinder of the internal combustion engine. The detecting unit detects vibrations derived from combustion of the internal combustion engine (vibrations in the cylinder), including the vibration corresponding to the resonance mode. The determining unit determines, based on the detected vibrations, whether knocking occurred in the internal combustion engine or not. When knocking occurs in the cylinder, in-cylinder pressure of the internal combustion engine resonates. The resonance of in-cylinder pressure results in vibrations of the internal combustion engine. For instance, a vibration particular to knocking can be detected by extracting a vibration within the frequency band of in-cylinder resonance frequency from the in-cylinder pressure. The resonance frequency of in-cylinder pressure has a value that corresponds to a resonance mode of air column vibration in the cylinder. Representative resonance mode that can be detected particularly at the time of knocking includes a first radial resonance mode and first, second, third and fourth tangential resonance modes. When the in-cylinder pressure at the upper central portion of the cylinder is sensed, by way of example, it is possible to sense a vibration caused by combustion of the internal combustion engine that is much influenced by the vibration in the frequency band of first radial resonance mode. When the in-cylinder pressure in a direction orthogonal to the central axis of cylinder is sensed, is possible to sense a vibration caused by combustion of the internal combustion engine that is much influenced by the vibrations in the frequency bands of first, second, third and fourth tangential resonance modes. Therefore, by providing the detecting unit at the detection position corresponding to each resonance mode, it becomes possible to detect the vibration caused by combustion of the internal combustion engine that is much influenced by the vibration of each resonance mode. Therefore, by extracting the vibration of the frequency band corresponding to the resonance mode including a vibration particular to knocking, the vibration particular to knocking can be detected from the detected vibrations, and hence, a knocking determination device that can accurately determine whether the knocking occurs or not in the internal combustion engine can be provided.

Preferably, the detecting unit is provided from an upper central portion of the cylinder into the cylinder of the internal combustion engine, and detects vibrations caused by combustion of the internal combustion engine including a vibration corresponding to the radial mode, based on pressure in the cylinder.

According to the present invention, the detecting unit is provided at the upper central portion of the cylinder of the internal combustion engine to the inside of the cylinder. The detecting unit detects vibrations caused by combustion of the internal combustion engine, including a vibration corresponding to the radial mode (for example, first radial resonance mode), based on the pressure in the cylinder. In the vibration of the frequency band that corresponds to the first radial resonance mode detected by the detecting unit provided from the upper central portion of the cylinder toward the inside of cylinder, noise generated at the normal combustion of internal combustion engine is hardly detected. Further, the vibration corresponding to knocking includes the vibration of the frequency band corresponding to the first radial resonance mode. Therefore, by detecting vibration of the frequency band corresponding to the first radial resonance mode, vibration corresponding to knocking can be detected with high accuracy, while vibration caused by noise or the like generated by the engine operation can be avoided.

More preferably, the detecting unit is provided on a side surface of the internal combustion engine, and detects vibrations caused by combustion of the internal combustion engine including a vibration corresponding to the tangential mode, based on pressure in the cylinder.

According to the present invention, the detecting unit is provided on the side surface of the cylinder in the internal combustion engine. The detecting unit detects vibrations caused by combustion of the internal combustion engine (in-cylinder pressure vibrations) including vibrations corresponding to the tangential mode (such as first, second, third and fourth tangential resonance modes), based on the pressure in the cylinder. The vibration particular to knocking includes a vibration of the frequency band corresponding to the tangential mode. Therefore, by extracting vibrations of the frequency band of at least one resonance mode among the first, second, third and fourth tangential resonance modes including the vibration particular to knocking, it becomes possible to detect the vibration particular to knocking from the detected vibrations.

More preferably, the detecting unit is provided on the internal combustion engine and detects vibrations caused by combustion of the internal combustion engine including a vibration corresponding to the tangential mode.

According to the present invention, the detecting unit is provided on the internal combustion engine (for example, on the cylinder block or cylinder head). The detecting unit detects vibrations caused by combustion of the internal combustion engine, including a vibration corresponding to the tangential mode (for example, first, second, third and fourth tangential resonance modes). The vibrations generated by the operation of internal combustion engine including the vibration corresponding to knocking includes a vibration of the frequency band that corresponds to the tangential mode. Therefore, by extracting the vibration of the frequency band of at least one of the first, second, third and fourth tangential resonance modes from the vibrations detected by the detecting unit provided on the internal combustion engine, the vibration corresponding to knocking can be detected with high accuracy from the detected vibrations.

More preferably, the knocking determination device further includes an extracting unit extracting a vibration of a frequency band corresponding to the resonance mode. The determining unit determines whether knocking occurred in the internal combustion engine or not, based on the extracted vibration.

According to the present invention, the extracting unit extracts the vibration of the frequency band that corresponds to the resonance mode (such as the first radial resonance mode), from the detected vibrations. The determining unit determines whether the internal combustion engine knocks or not, based on the extracted vibration. Thus, based on the vibration of the frequency band that corresponds to the first radial resonance mode, whether the internal combustion engine knocks or not can be determined.

More preferably, the extracting unit is either a band-pass filter or a high-pass filter.

According to the present invention, by a band-pass filter and a high-pass filter, the vibration corresponding to the resonance mode (such as the first radial resonance mode) can be extracted from the detected vibrations. Thus, whether the internal combustion engine knocks or not can be determined with high accuracy.

More preferably, the knocking determination device further includes: a waveform detecting unit detecting a vibration waveform of a predetermined interval of crank angles, based on the extracted vibration; and a storage unit storing in advance a vibration waveform of the internal combustion engine. The determining unit determines whether knocking occurred in the internal combustion engine or not, based on a result of comparison between the detected waveform and the stored waveform.

According to the present invention, the waveform detecting unit detects, based on the extracted vibration, the vibration waveform of a predetermined interval of the crank angles. The storage unit stores in advance a vibration waveform of the internal combustion engine when knocking occurs. The determining unit determines, based on a result of comparison between the detected waveform and the stored waveform, whether the internal combustion engine knocks or not. By way of example, a knock waveform model representing a vibration waveform when knocking occurs is prepared and stored in advance, through an experiment or the like, and by comparing the knock waveform model and the detected waveform, whether knocking occurred or not can be determined. Thus, whether or not the engine knocks can be determined based not only on the magnitude of vibration but also on the timing at which vibration occurs. As a result, whether the internal combustion engine knocks or not can be determined with high accuracy.

According to another aspect, the present invention provides a knocking determination device for determining knocking of an internal combustion engine. The knocking determination device includes: a waveform detecting unit detecting a vibration waveform of a frequency band corresponding to a radial mode as a resonance mode of combustion pressure propagation in a cylinder of the internal combustion engine; a storage unit storing in advance a vibration waveform of the frequency band corresponding to the radial mode; and a determining unit determining whether knocking occurred in the internal combustion engine or not, based on a result of comparison between the detected waveform and the stored waveform.

According to the present invention, the waveform detecting unit detects the vibration waveform that corresponds to the radial mode (such as the first radial resonance mode), which is a resonance mode of combustion pressure propagation in the cylinder of internal combustion engine. The storage unit stores in advance the vibration waveform of the frequency band that corresponds to the first radial resonance mode. The determining unit determines, based on a result of comparison between the detected waveform and the stored waveform, whether the internal combustion engine knocks or not. By way of example, a knock waveform model representing a vibration waveform when knocking occurs is prepared and stored in advance, through an experiment or the like. The knock waveform model is the vibration waveform of the frequency band that corresponds to the first radial resonance mode. In the vibration of the frequency band that corresponds to the first radial resonance mode, noise generated at the normal combustion of internal combustion engine is hardly detected. Further, the vibration particular to knocking includes the vibration of the frequency band corresponding to the first radial resonance mode. Therefore, by detecting vibrations of the frequency band corresponding to the first radial resonance mode, the vibration corresponding to knocking can be detected with high accuracy, while vibration caused by noise or the like generated by the engine operation can be avoided. By comparing the knock waveform model and the detected waveform, whether knocking occurred or not can be determined. Thus, whether or not the engine knocks can be determined based not only on the magnitude of vibration but also on the timing at which vibration occurs. As a result, whether the internal combustion engine knocks or not can be determined with high accuracy.

Preferably, the stored waveform is a vibration waveform based on pressure at an upper central portion in the cylinder of the internal combustion engine.

According to the present invention, the stored waveform is the vibration waveform based on the pressure at the upper central portion of the cylinder of internal combustion engine. In the vibration of the frequency band that corresponds to the first radial resonance mode, noise generated at the normal combustion of internal combustion engine is hardly detected. Further, the vibration particular to knocking includes the vibration of the frequency band corresponding to the first radial resonance mode. Therefore, by detecting a vibration of the frequency band corresponding to the first radial resonance mode, vibration corresponding to knocking can be detected with high accuracy, while vibration caused by noise or the like generated by the engine operation can be avoided.

More preferably, the stored waveform is a waveform obtained by the waveform detecting unit provided on the internal combustion engine.

According to the present invention, the stored waveform is the waveform obtained by the waveform detecting unit provided on the internal combustion engine (for example, on the cylinder block or cylinder head). By way of example, from the waveform detected by the waveform detecting unit, the waveform of vibration of the frequency band corresponding to the first radial resonance mode is extracted and stored as the knock waveform model. By comparing the stored knock waveform model with the waveform detected during an operation of the internal combustion engine, whether the internal combustion engine knocks or not can be determined with high accuracy.

According to another aspect, the present invention provides a knocking determination device for determining knocking of an internal combustion engine. The knocking determination device includes: a waveform detecting unit detecting a vibration waveform of a frequency band corresponding to a tangential mode as a resonance mode of combustion pressure propagation in a cylinder of the internal combustion engine; a storage unit storing in advance a vibration waveform of the frequency band corresponding to the tangential mode; and a determining unit determining whether knocking occurred in the internal combustion engine or not, based on a result of comparison between the detected waveform and the stored waveform.

According to the present invention, the waveform detecting unit detects the vibration waveform of the frequency band corresponding to the tangential mode (for example, first, second, third and fourth tangential resonance modes) among the resonance modes of combustion pressure propagation in the cylinder of internal combustion engine. The storage unit stores in advance the vibration waveform of the frequency band that corresponds to the tangential mode of the cylinder of internal combustion engine. The determining unit determines, based on a result of comparison between the detected waveform and the stored waveform, whether the internal combustion engine knocks or not. By way of example, a knock waveform model representing a vibration waveform when knocking occurs is prepared and stored in advance, through an experiment or the like. By way of example, a vibration waveform of a frequency band of at least one resonance mode among the first, second, third and fourth tangential resonance modes including a vibration particular to knocking is set as the knock waveform model. By comparing the knock waveform model with the detected waveform, the vibration particular to knocking can be detected from the detected vibrations with high accuracy. Thus, whether or not the engine knocks can be determined based not only on the magnitude of vibration but also on the timing at which vibration occurs. As a result, a knocking determination device that can accurately determine whether the knocking occurs or not in the internal combustion engine can be provided.

Preferably, the stored waveform is a vibration waveform based on pressure in a direction orthogonal to a central axis of the cylinder of the internal combustion engine.

According to the present invention, the stored waveform is the waveform of vibration based on the pressure in the direction orthogonal to the central axis of cylinder of the internal combustion engine. The vibration in the frequency band that corresponds to the tangential mode can be detected based on the pressure in the direction orthogonal to the central axis of cylinder of the internal combustion engine.

More preferably, the stored waveform is a waveform obtained by the waveform detecting unit provided on the internal combustion engine.

According to the present invention, the stored waveform is the waveform obtained by the waveform detecting unit provided on the internal combustion engine (for example, on the cylinder block or cylinder head). By way of example, from the waveforms detected by the waveform detecting unit, the waveform of vibration in the frequency band corresponding to the tangential mode is extracted, and stored as the knock waveform model. By comparing the stored knock waveform model with the waveform detected during an operation of the internal combustion engine, whether the internal combustion engine knocks or not can be determined with high accuracy.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B represent vibration waveforms of in-cylinder pressure during normal combustion and at the occurrence of knocking.

FIG. 3 shows theoretical frequencies corresponding to various resonance modes.

FIG. 10 is a schematic configuration diagram showing an engine controlled by a knock determination device according to a second embodiment of the present invention.

FIGS. 11A and 11B represent power spectra of vibration of in-cylinder pressure on a side surface of the cylinder.

DESCRIPTION OF THE PREFERRED EMBODIMENTS

Figure 1:
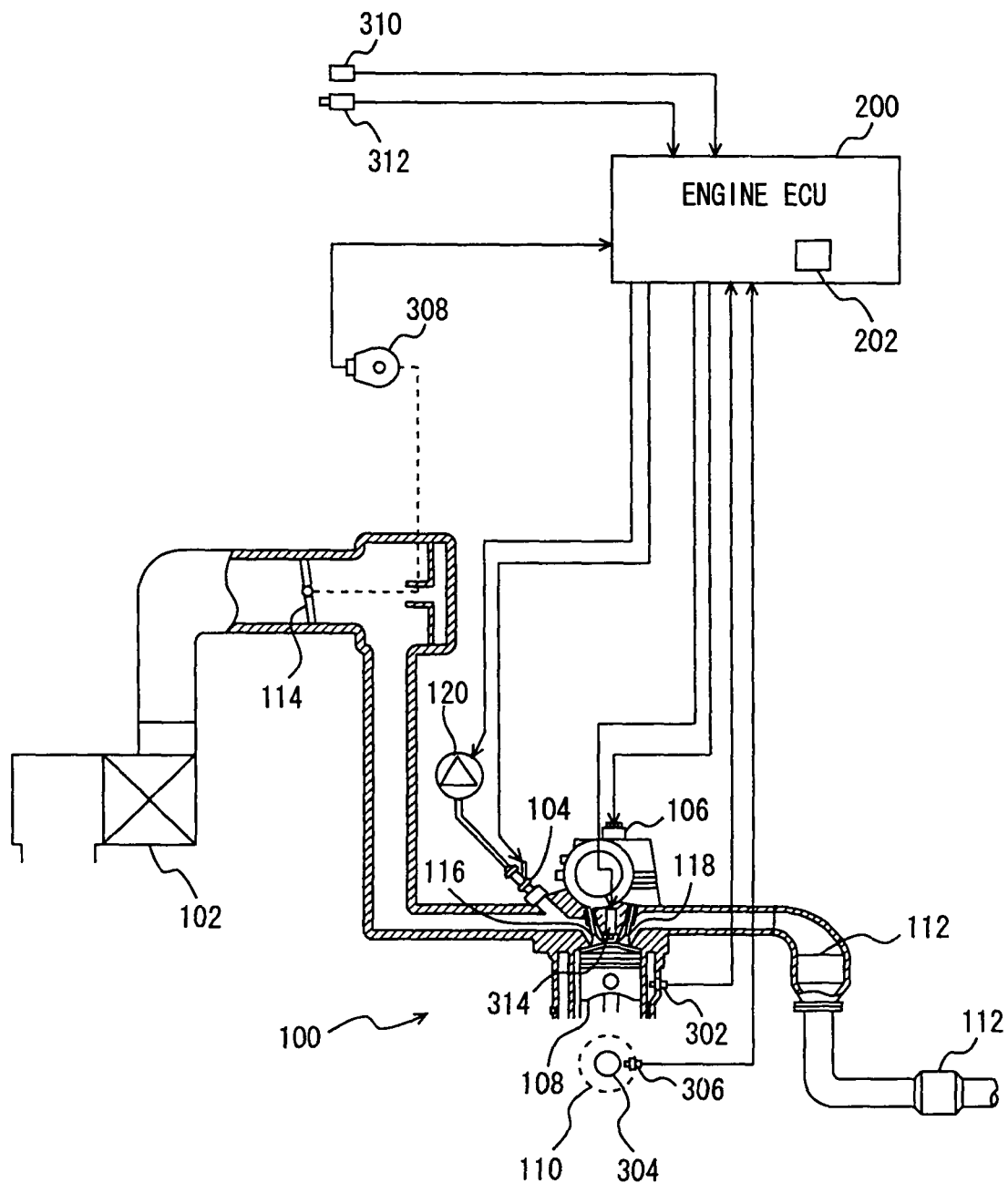
FIG. 1 is a schematic configuration diagram showing an engine controlled by a knock determination device according to a first embodiment of the present invention.

Embodiments of the present invention will be described in the following with reference to the figures. In the following description, the same components are denoted by the same reference characters. The names and functions are also the same. Therefore, detailed description thereof will not be repeated.

First Embodiment

With reference to FIG. 1, an engine 100 of a vehicle incorporating a knock determination device according to an embodiment of the present invention will be described. The knock determination device of the present embodiment is implemented by a program executed, for example, by an engine ECU (Electronic Control Unit) 200.

Engine 100 is an internal combustion engine, in which a mixture of air taken through an air cleaner 102 and a fuel injected by an injector 104 is ignited by a spark plug 106 and burned in a combustion chamber.

The burning of air-fuel mixture causes combustion pressure that presses a piston 108 down, whereby a crank shaft 110 rotates. The combusted air-fuel mixture (or exhaust gas) is purified by a three-way catalyst 112 and thereafter discharged outside the vehicle. The amount of air taken into engine 110 is adjusted by a throttle valve 114.

Engine 100 is controlled by engine ECU 200 having connected thereto a water temperature sensor 302, a crank position sensor 306 arranged opposite a timing rotor 304, a throttle opening sensor 308, a vehicle speed sensor 310, and an ignition switch 312.

Water temperature sensor 302 detects temperature of cooling water in engine 100 at a water jacket and transmits a signal representing a resultant detection to engine ECU 200.

Timing rotor 304 is provided at a crank shaft 110 and rotates as crank shaft 110 does. Timing rotor 304 is circumferentially provided with a plurality of protrusions spaced by a predetermined distance. Crank position sensor 306 is arranged opposite the protrusions of timing rotor 304. When timing rotor 304 rotates, an air gap between the protrusions of timing rotor 304 and crank position sensor 306 varies, so that magnetic flux passing through a coil portion of crank position sensor increases/decreases, thus generating electromotive force. Crank position sensor 306 transmits a signal representing the electromotive force to engine ECU 200. From the signal transmitted from crank position sensor 306, engine ECU 200 detects a crank angle.

Throttle opening sensor 308 detects a throttle open position and transmits a signal representing a resultant detection to engine ECU 200. Vehicle speed sensor 310 detects number of rotation of a wheel (not shown) and transmits a signal representing a resultant detection to engine ECU 200. From the number of rotation of the wheel, engine ECU 200 calculates the vehicle speed. Ignition switch 312 is turned on by a driver, for starting engine 100.

An in-cylinder pressure sensor 314 is provided from the upper central portion of a cylinder of engine 100 into the cylinder, and senses the pressure in the cylinder. In-cylinder pressure sensor 314 transmits a signal indicating the sensed pressure in the cylinder to engine ECU 200. In the present embodiment, in-cylinder sensor 314 is a sensor integrated, for example, with the ignition plug.

Engine ECU 200 uses the signals transmitted from each sensor and ignition switch 312 as well as a map and program stored in a memory 202 to perform an operation to control equipment so that engine 100 attains a desired driving condition.

In the present embodiment, using a signal transmitted from in-cylinder pressure sensor 314 and the crank angle, engine ECU 200 detects a waveform of vibration of engine 100 at a predetermined knock detection gate (a section from a predetermined first crank angle to a predetermined second crank angle) (hereinafter such waveform of a vibration will also simply be referred to as "vibration waveform") and from the detected vibration waveform determines whether engine 100 knocks. The knock detection gate of the present embodiment is from the top dead center (0°) to 90° in a combustion stroke. It is noted that the knock detection gate is not limited thereto.

As shown in FIG. 2A, when knocking occurs, a vibration component particular to knocking is detected in the in-cylinder pressure at the upper central portion of the cylinder, as detected by in-cylinder pressure sensor 314. During normal combustion when the vibration corresponding to knocking does not occur, the vibration component particular to knocking is not included in the in-cylinder pressure as detected by in-cylinder pressure sensor 314, and the noise itself is weak.

On the other hand, as shown in FIG. 2B, when knocking occurs, a vibration component particular to knocking is detected in the in-cylinder pressure at the side surface of the cylinder, as in FIG. 2A, and during normal combustion when the vibration corresponding to knocking does not occur, noise other than knocking is observed.

The reason for this is as follows. In the in-cylinder pressure detected by in-cylinder pressure sensor 314, the vibration of tangential mode (circumferential direction) in the normal combustion is difficult to detect, as the vibration has its node at the central portion of the cylinder. Further, the vibration particular to knocking includes vibration in the first radial resonance mode, and therefore, the in-cylinder pressure waveform in the radial mode (radial direction) is mainly detected.

The phenomenon will be described specifically. When knocking occurs in the cylinder of engine 100, in-cylinder pressure resonates. By the resonance of in-cylinder pressure, the cylinder block in engine 100 vibrates. Thus, naturally, there is a tendency that the frequency of cylinder block vibration is included in the frequency band of in-cylinder pressure resonance.

The in-cylinder pressure resonance frequency attains to be the frequency corresponding to the resonance mode of air-column in the cylinder. The resonance mode includes the radial mode, which is the resonance mode of vibration in the radial direction of cylinder, and the tangential mode, which is the resonance mode of vibration in the circumferential direction of cylinder. The representative frequency bands in which vibration particular to knocking appears include frequency bands of first radial resonance mode and first, second, third and fourth tangential resonance modes. In the following description, the resonance mode including at least one of first, second, third and fourth tangential resonance modes will be simply referred to as the "tangential mode," and the resonance mode including the first radial mode will be simply referred to as the "radial mode."

The resonance frequency of the in-cylinder pressure is calculated from the resonance mode, bore diameter and the speed of sound. FIG. 3 shows theoretical frequencies f(1) to f(6) that correspond to the order number of respective resonance modes, when the speed of sound and bore diameter are assumed to be constant. The theoretical frequency becomes higher in the order of first tangential, second tangential, first radial, third tangential and fourth tangential modes.

Figure 4:
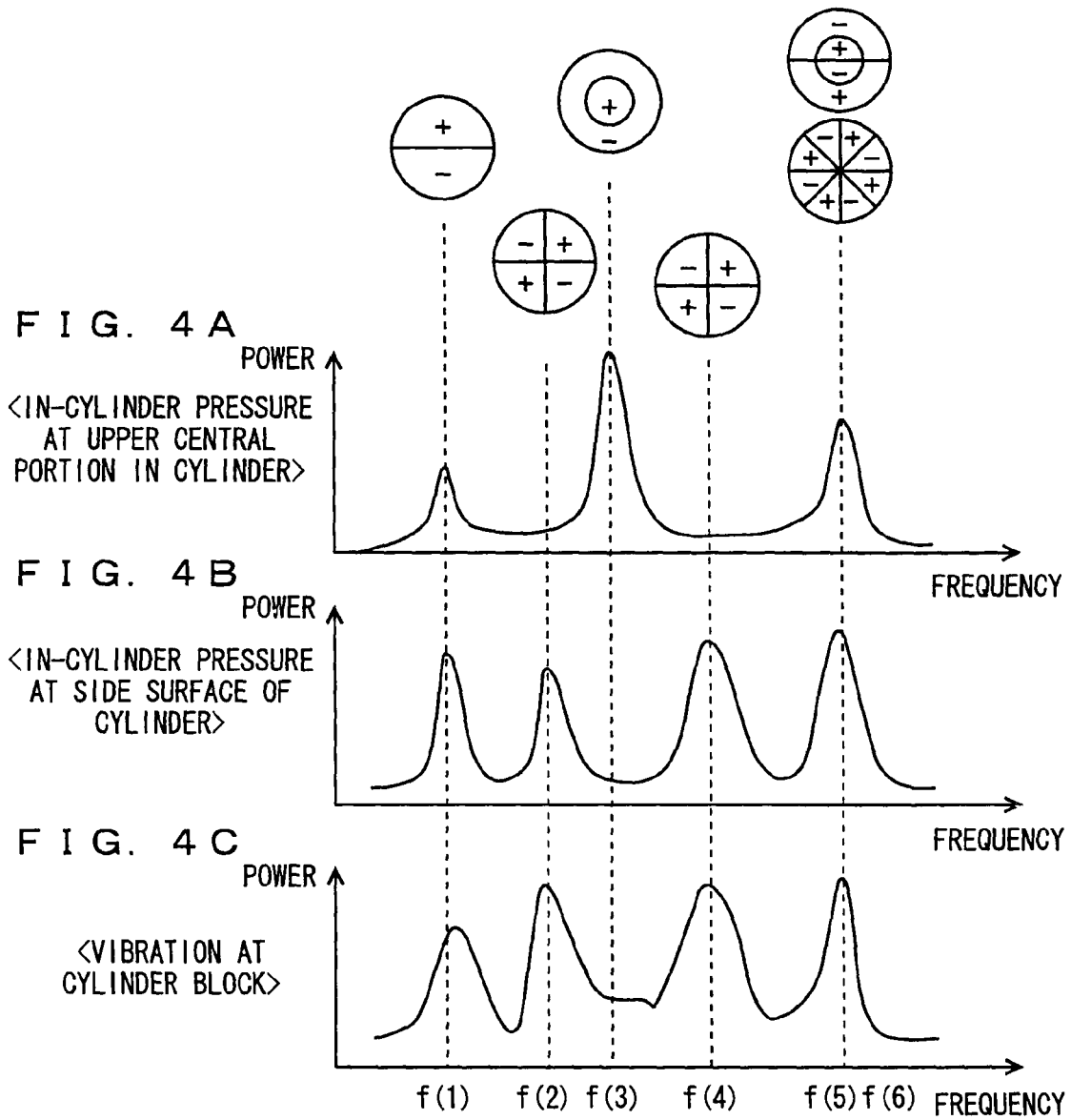
FIGS. 4A to 4C represent power spectra of vibrations of the in-cylinder pressure and at the cylinder block.

As shown in FIG. 4A, the power spectrum of vibration component based on the in-cylinder pressure at the upper central portion of the cylinder detected by in-cylinder pressure sensor 314 when knocking occurs has a waveform of which power value is large at the radial first frequency f(3). Further, in the vibration of second and third tangential resonance modes, there is a node at the central portion of the cylinder, and therefore, the waveform has small power values at frequencies f(2) and f(4). Therefore, it follows that the vibration waveform based on the in-cylinder pressure detected by in-cylinder pressure sensor 314 is not much influenced by the vibration in the frequency band that corresponds to the tangential mode.

Further, as shown in FIG. 4B, the power spectrum of vibration component based on the in-cylinder pressure at the side surface of the cylinder when knocking occurs has a waveform of which power value is large at frequencies f(1), f(2), f(3) and f(4) of the first, second, third and fourth tangential modes. Further, in the vibration of first radial resonance mode, there is a node at the side surface portion of the cylinder, and therefore, the waveform has small power value at frequency f(3). Therefore, it follows that the vibration waveform based on the in-cylinder pressure at the side surface of the cylinder is not much influenced by the vibration in the frequency band that corresponds to the radial mode.

Further, as shown in FIG. 4C, the power spectrum of vibration waveform of the cylinder block of engine 100 when knocking occurs varies in the similar manner as the vibration waveform based on the in-cylinder pressure at the side surface of the cylinder, and the waveform has small power value at the radial first frequency f(3) and larger power values at the frequencies f(1), f(2), f(3) and f(4) of first, second, third and fourth tangential modes. Therefore, it can be seen that the vibration characteristic of the in-cylinder pressure at the side surface of the cylinder matches the vibration characteristic of the cylinder block of engine 100. Therefore, it follows that the vibration waveform of the cylinder block of engine 100 is not much influenced by the vibration in the frequency band that corresponds to the radial mode.

From the foregoing, the radial first vibration component of the in-cylinder pressure detected by in-cylinder pressure sensor 314 has such a waveform from which noise other than knocking is hardly detected at the time of normal combustion and at the time when knocking occurs, as shown in FIG. 2A.

The present invention is characterized in that engine ECU 200 detects vibrations caused by combustion of engine 100 including a vibration corresponding to a resonance mode, by using a sensor provided at a detection position corresponding to any of the resonance modes including the tangential mode and the radial mode, which are resonance modes of combustion pressure propagation in the cylinder of engine 100, and that whether knocking occurred in the internal combustion engine or not is determined based on the detected vibrations.

In the present embodiment, the vibration component of the frequency band of the first radial resonance mode in the cylinder of engine 100 is detected by in-cylinder pressure sensor 314 provided at the upper central portion of the cylinder, and engine ECU 200 determines, based on the detected vibration component, whether the knocking occurred in the internal combustion engine or not. In the present embodiment, the "detection position corresponding to the resonance mode" is the "upper central portion of the cylinder."

Figure 5:
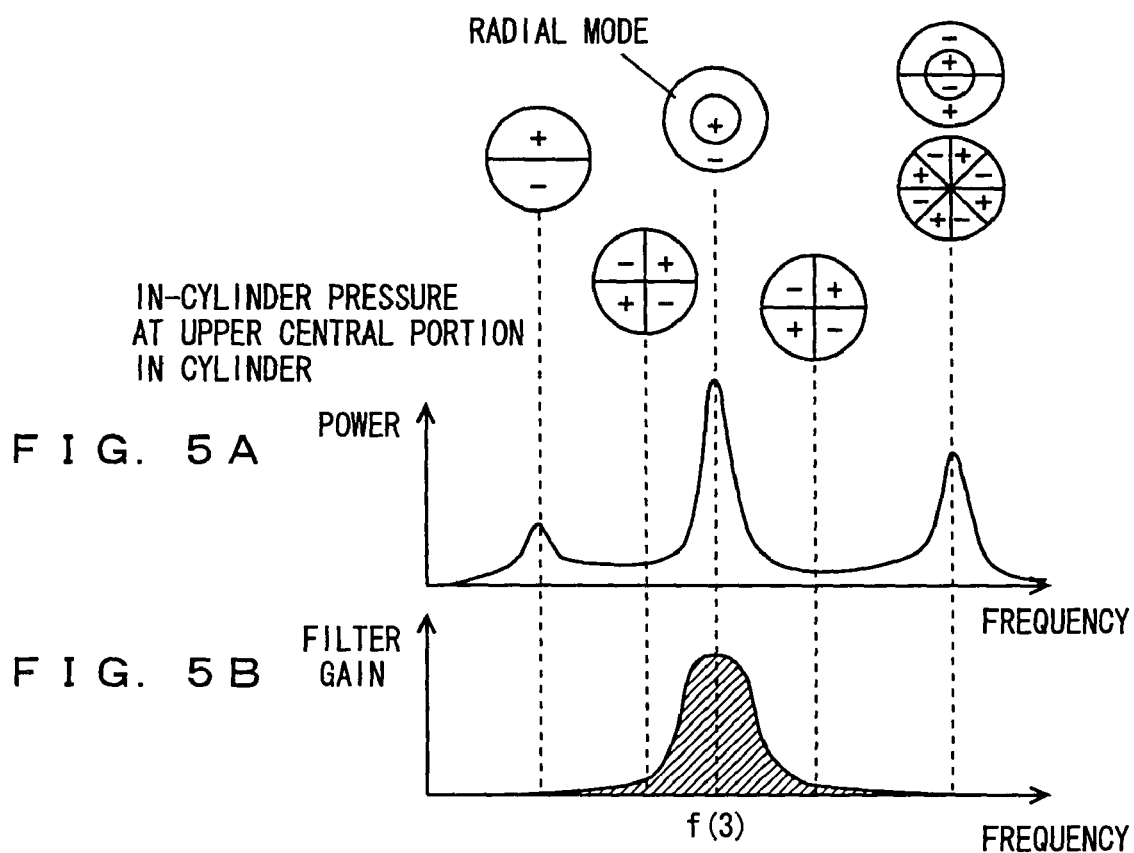
FIGS. 5A and 5B represent power spectra of vibration of in-cylinder pressure at the upper central portion of the cylinder.

As shown in FIG. 5A, the power spectrum of vibration component detected by in-cylinder pressure sensor 314 when knocking occurs has its power value increased at the frequency f(3). In the present embodiment, by using a band-pass filter having such a filter gain characteristic as shown in FIG. 5B, the vibration waveform of the frequency band including frequency f(3) is extracted, and the vibration waveform of the in-cylinder pressure is formed. In place of the band-pass filter, a high-pass filter may be used. In that case, vibration waveform of the frequency band higher than a predetermined frequency, including frequency f(3), may be extracted to form the vibration waveform of the in-cylinder pressure.

The obtained vibration waveform is compared with a knock waveform model stored in memory 202 of engine ECU 200. The knock waveform model is the model of a vibration waveform where engine 100 knocks.

Figure 6:
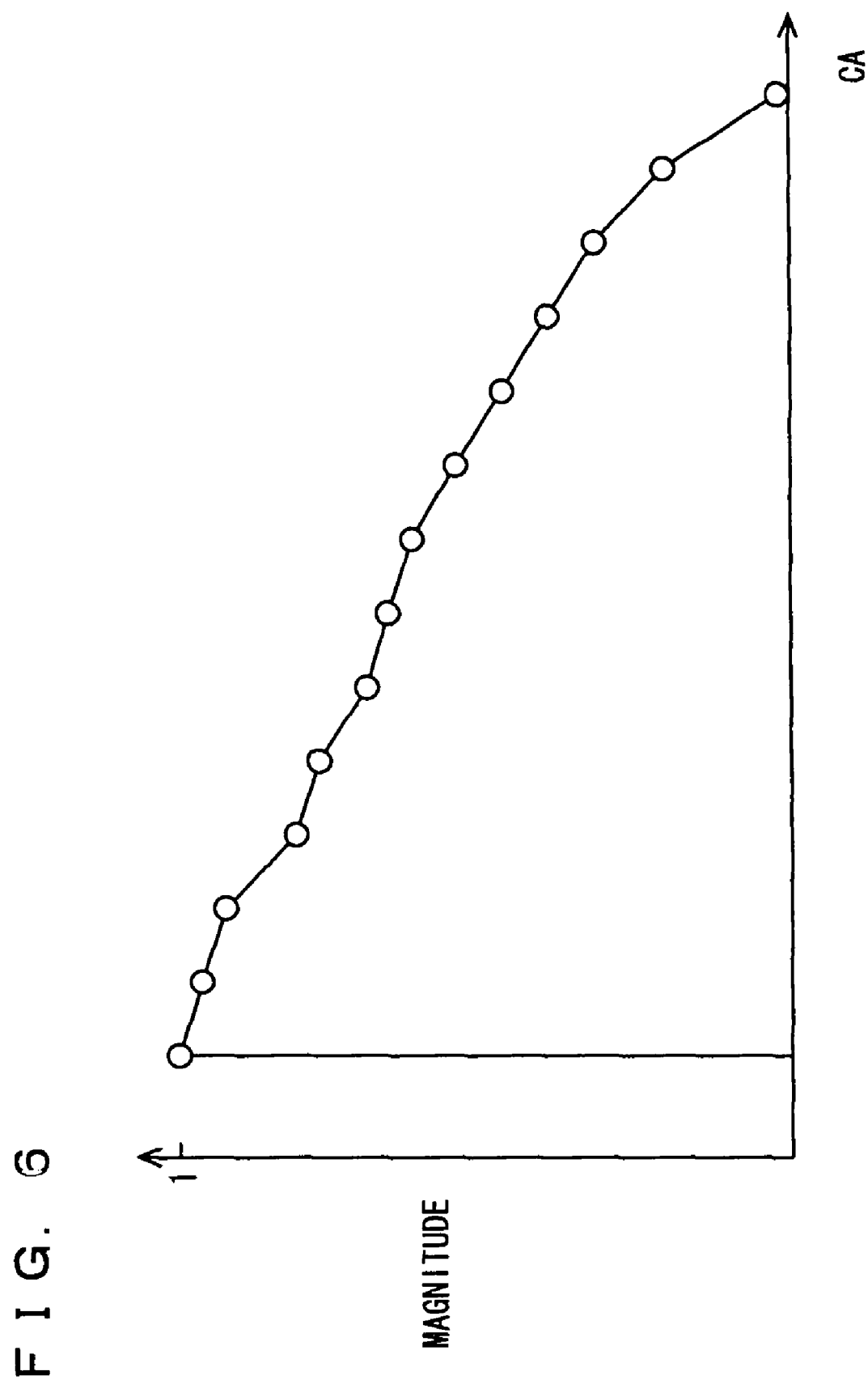
FIG. 6 represents a knock waveform model stored in a memory of engine ECU.

As shown in FIG. 6, in the knock waveform model, magnitude of vibration is represented by a dimensionless number of 0 to 1 and does not uniquely correspond to a crank angle. More specifically, for the knock waveform model of the present embodiment, while it is determined that the vibration decreases in magnitude as the crank angle increases after the peak value in magnitude of vibration, the crank angle at which the vibration magnitude assumes the peak value is not determined. Here, the knock waveform model represents the vibration waveform of the frequency band of the first radial mode.

In the present embodiment, knock waveform model corresponds to the portion of a vibration caused by knocking following the peak value in magnitude of the vibration. It should be noted that a knock waveform model corresponding to a vibration attributed to knocking following the rise of the vibration might be stored.

The knock waveform model is obtained as follows: an experiment or the like is conducted to force knocking of engine 100, and the vibration waveform of engine 100 is detected, from which the knock waveform model is created and stored in advance. By way of example, the knock waveform model may be calculated by integrating the signals sensed by in-cylinder pressure sensor 314 at every predetermined angle (every five degrees (5°) in the present embodiment), or it may be calculated using root mean square (RMS) or Hilbert envelope. The knock waveform model may be formed by different methods. Engine ECU 200 compares the detected waveform with the stored knock waveform model, and determines whether engine 100 knocks or not.

Preferably, the knock waveform model is formed based on the vibration corresponding to the resonance mode. Specifically, the knock waveform model should preferably be formed by detecting, using in-cylinder pressure sensor 314, the vibration component of in-cylinder pressure at the upper central portion of the cylinder when knocking is forced by an experiment or the like, and extracting the vibration of the frequency band including frequency f(3) corresponding to the first radial mode using a band-pass filter or the like having such a gain characteristic as shown in FIG. 5B.

Figure 9:
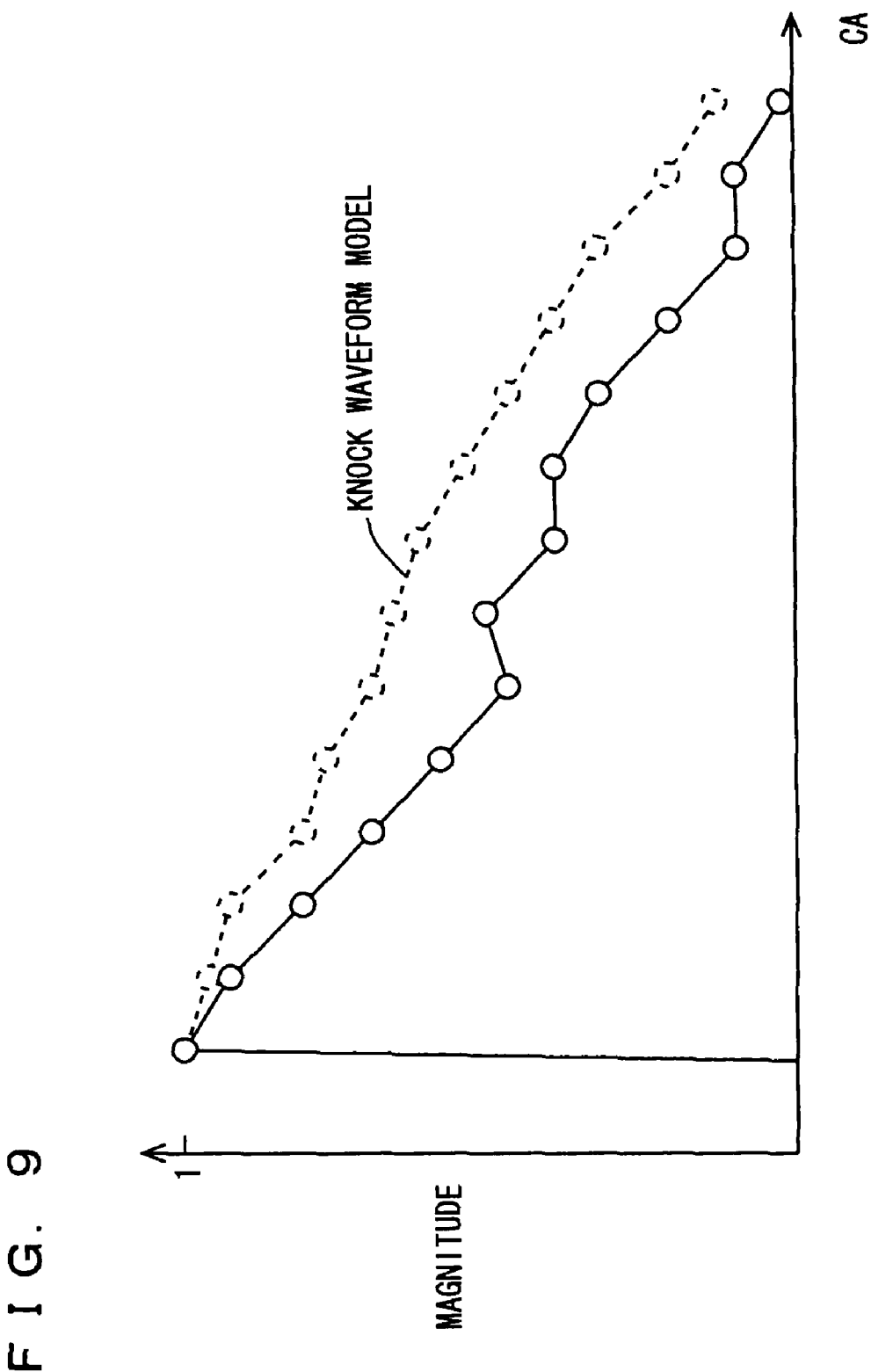
FIG. 9 shows comparison between the normalized vibration waveform and the knock waveform model.

Referring to FIG. 9, the control structure of the program executed by engine ECU 200 in the knocking determination device in accordance with the present embodiment will be described.

At step (hereinafter simply referred to as "S") 100, engine ECU 200 detects the magnitude of vibration in the radial mode based on the in-cylinder pressure at the upper central portion of the cylinder of engine 100 from a signal transmitted from in-cylinder pressure sensor 314. Engine ECU 200 detects, from the vibration component transmitted from in-cylinder pressure sensor 314, the magnitude of vibration in the frequency band that corresponds to the first radial resonance mode extracted by the band-pass filter. The vibration magnitude is represented by an output voltage value of in-cylinder pressure sensor 314. Note that the vibration magnitude may be represented by a value corresponding to the value of the voltage output from in-cylinder pressure sensor 314. The vibration magnitude is detected in a combustion stroke for an angle from a top dead center to (a crank angle of) 90°.

At S102, engine ECU 200 calculates for a crank angle of every five degrees an integration (hereinafter also be referred to as an "integrated value") of values of voltage output from in-cylinder pressure sensor 314 (i.e., representing magnitude of vibration). The integrated value is calculated for the frequency band that corresponds to the first radial resonance mode. From the calculated integrated value, the vibration waveform of engine 100 is formed.

At S104, engine ECU 200 normalizes the vibration waveform. Here, normalizing a waveform means dividing each integrated value by the largest of the integrated values in the detected waveform, for example, so that the vibration magnitude is represented by a dimensionless number of 0 to 1. The divisor of each integrated value is not limited to the largest of the integrated values.

At S106, engine ECU 200 calculates a coefficient of correlation K, which is a value related to a deviation between the normalized vibration waveform and the knock waveform model. A timing of a normalized vibration waveform providing a vibration maximized in magnitude and a timing of a knock waveform model providing a vibration maximized in magnitude are matched, while a deviation in absolute value (or an amount of offset) between the normalized vibration waveform and the knock waveform model is calculated for each crank angle (of five degrees), whereby the coefficient of correlation K is obtained.

When we represent the absolute value of deviation between the normalized vibration waveform and the knock waveform model for each crank angle by $\Delta S(I)$ (wherein I is a natural number) and the vibration magnitude of knock waveform model integrated by the crank angle (i.e., the area of knock waveform model) by S, then the coefficient of correlation K is calculated by an equation $K=(S-\Sigma\Delta S(I))/S$, where $\Sigma\Delta S(I)$ represents a sum of $\Delta S(I)$s from the top dead center to 90°. Note that the coefficient of correlation K may be calculated by a different method.

At S108, engine ECU 200 calculates a knock intensity N. When we represent the maximum value of calculated integrated value by P and the value representing the magnitude of vibration of engine 100 while engine 100 is not knocking (that is, at the time of normal combustion) by BGL (Back Ground Level), the nock intensity N is calculated by the equation $N=P \times K/BGL$. The BGL is stored in memory 202. Note that knock intensity N may be calculated by a different method.

At S110, engine ECU 200 determines whether knock intensity N is larger than a predetermined reference value. If the knock intensity N is larger than the predetermined reference value (YES at S110), the control proceeds to S112. Otherwise (NO at S110), the control proceeds to S116.

At S112, engine ECU 200 determines that engine 100 knocks. At S114 engine ECU 200 introduces a spark retard. At S116 engine ECU 200 determines that engine 100 does not knock. At S118 engine ECU 200 introduces a spark advance.

An operation of engine ECU 200 of the knock determination device according to the present embodiment based on the above-described configuration and flowchart will be described.

When a driver turns on ignition switch 312 and engine 100 starts, vibration magnitude of engine 100 is detected from a signal transmitted from in-cylinder pressure sensor 314 (S100).

Figure 8:
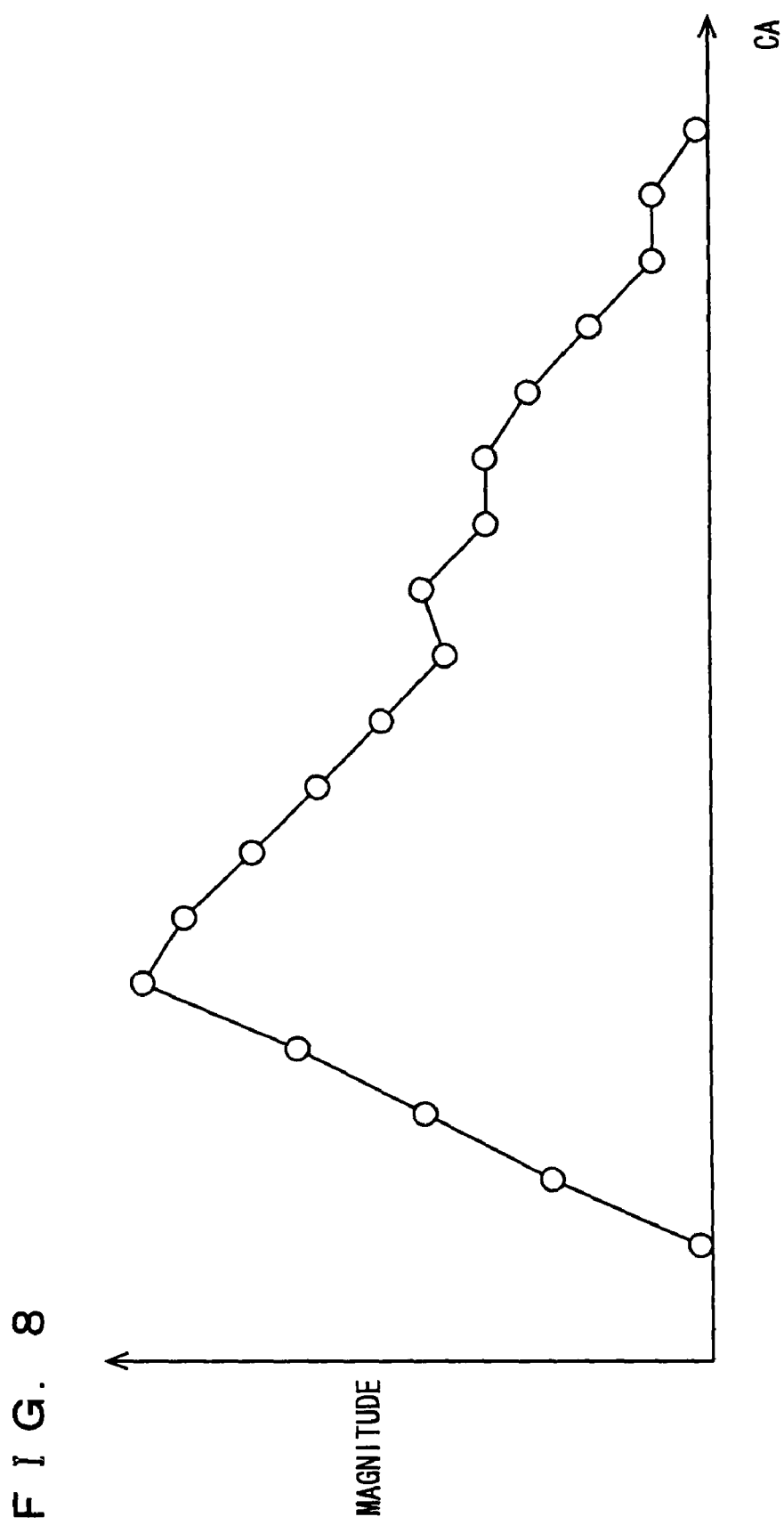
FIG. 8 shows a vibration waveform of the engine.

In a combustion stroke for a range from the top dead center to 90°, an integrated value for every five degrees is calculated for vibrations in the frequency band of first radial mode (S102), and from the calculated integrated value, the vibration waveform is formed. Thus, the vibration waveform of engine 100 is detected as the waveform of vibration in the frequency band of first radial mode, as shown in FIG. 8.

As an integrated value for every five degrees is used to detect a vibration waveform, it becomes possible to detect a vibration waveform of which delicate variations are suppressed. This makes it easier to compare a detected vibration waveform with the knock waveform model.

Each of the integrated values is divided by the maximum integrated value, to normalize the waveform (S104), to enable comparison between the vibration waveform and the knock waveform model. Here, it is assumed that each integrated value is divided by the integrated value for 20° to 25° (fifth integrated value from the left in FIG. 8) to normalize the vibration waveform. By the normalization, vibration magnitude in the vibration waveform is represented by a dimensionless number of 0 to 1. Thus, the detected vibration waveform can be compared with the knock waveform model regardless of the vibration magnitude. This can eliminate the necessity of storing a large number of knock waveform models corresponding to the magnitude of vibration and thus, facilitates preparation of the knock waveform model.

As shown in FIG. 9, a timing of a normalized vibration waveform providing a vibration maximized in magnitude and that of a knock waveform model providing a vibration maximized in magnitude are matched, while a deviation in absolute value $\Delta S(I)$ between the normalized vibration waveform and the knock waveform model is calculated for each crank angle. Sum $\Sigma\Delta S(I)$ of $\Delta S(I)$ and the value S representing a magnitude of vibration in knock waveform model that is integrated by crank angle are used to calculate the coefficient of correlation $K=(S-\Sigma\Delta S(I))/S$ (S106). This allows numerical representation of a degree of matching between the detected vibration waveform and the knock waveform model, and hence allows objective determination.

The product of the coefficient of correlation K calculated in this manner and the largest integrated value P is divided by the BGL to calculate knock intensity N (S108). Thus, whether the vibration of engine 100 is attributed to knocking can be analyzed in greater detail, using vibration magnitude in addition to the degree of matching between the detected vibration waveform and the knock waveform model. Here, it is assumed that the product of coefficient of correlation K and the integrated value for 20°-25° is divided by BGL to calculate knock intensity N.

If knock intensity N is larger than a predetermined reference value (YES at S110) a determination is made that engine knocks (S112), and a spark retard is introduced (S114) to suppress knocking.

If knock intensity N is not larger than the predetermined reference value (NO at S110), a determination is made that the engine does not knock (S116), and a spark advance is introduced (S118).

As described above, in the knocking determination device in accordance with the present embodiment, the in-cylinder pressure sensor is provided at an upper central portion of the cylinder, and detects vibration component that corresponds to the first radial resonance mode in the engine cylinder. As the in-cylinder pressure sensor is provided at the position that corresponds to the first radial resonance mode, the vibration of internal combustion engine that is much influenced by the vibrations in the frequency band of first radial resonance mode can be detected. Based on the detected vibration, engine ECU 200 determines whether knocking occurred in the engine or not. As the vibrations in the frequency band corresponding to the first radial resonance mode are extracted, it is possible to remove noise other than knocking from the detected vibrations and to detect with high accuracy the vibration particular to knocking.

Further, the knock waveform model represents the vibration waveform of the frequency band that corresponds to the first radial resonance mode. By comparing the knock waveform model with the detected waveform, whether knocking occurred or not is determined. Thus, whether or not the engine knocks can be determined based not only on the magnitude of vibration but also on the timing at which vibration occurs. As a result, a knocking determination device that can accurately determine whether the knocking occurs or not in the internal combustion engine can be provided.

Further, in the present embodiment, whether the detected waveform represents vibration corresponding to knocking or not is determined by calculating the coefficient of correlation between the knock waveform model and the shape of the detected waveform to compare the two, while such an approach is not limiting and any other method may be used provided that the similarity between the two is given in a numerical value. By way of example, a numerical value representing similarity between the knock waveform model and the detected waveform may be obtained through pattern matching, and whether the detected waveform corresponds to vibration of knocking or not may be determined. Specific method of pattern matching has been known, and therefore, detailed description will not be given here.

Second Embodiment

In the following, the knocking determination device for an internal combustion engine in accordance with a second embodiment of the present invention will be described. The knocking determination device in accordance with the present embodiment differs from the knocking determination device in accordance with the first embodiment described above in that it includes a knock sensor 300 and an in-cylinder pressure sensor 316 provided on a side surface of the cylinder in place of in-cylinder pressure sensor 314. Except for these points, the configuration is the same as that of the knocking determination device in accordance with the first embodiment described above. The same components are denoted by the same reference characters. Their functions are also the same. Therefore, detailed description thereof will not be repeated here.

As shown in FIG. 10, in-cylinder pressure sensor 316 is provided on a side surface of a cylinder of engine 100, and senses the in-cylinder pressure in a direction orthogonal to the central axis of the cylinder. In-cylinder pressure sensor 316 transmits a signal representing the sensed pressure in the cylinder to engine ECU 200.

Knock sensor 300 is implemented by a piezoelectric element. As engine 100 vibrates, knock sensor 300 generates a voltage having a magnitude corresponding to that of the vibration. Knock sensor 300 transmits a signal representing the voltage to engine ECU 200.

As described with reference to FIG. 4A of the first embodiment above, the vibration particular to knocking includes vibrations of first to fourth tangential resonance modes. As to the in-cylinder pressure at the upper central portion of the cylinder, in the vibration of tangential resonance modes, there is a node at the central portion of the cylinder, and therefore, it might be difficult to detect vibration in the tangential mode. Therefore, in the present embodiment, engine ECU 200 detects vibrations in the frequency bands corresponding to first, second, third and fourth tangential resonance modes of the cylinder of engine 100 as shown in FIG. 4B by in-cylinder pressure sensor 316 provided on the side surface of the cylinder, and determines whether knocking occurred in the internal combustion engine or not based on the detected vibrations. In the present embodiment, the "detection position corresponding to the resonance mode" refers to the "side surface of the cylinder."

As shown in FIG. 11A, the power spectrum of vibration component detected by in-cylinder pressure sensor 316 when knocking occurs has power values increased at the frequencies f(1), f(2), f(3) and f(4). In the present embodiment, by using a band-pass filter having such a filter gain characteristic as shown in FIG. 11B, the frequency bands including frequencies f(1), f(2), f(4) and f(5) are extracted, to form the vibration waveform of the in-cylinder pressure. The frequency band to be extracted is not limited to the four frequency bands including frequencies f(1), f(2), f(4) and f(5), respectively. For instance, it may be any one of the four frequency bands, or a plurality of frequency bands may be selected, and it has only to be at least one of the frequency bands. In place of the band-pass filter, a high-pass filter may be used. In that case, vibration waveform of the frequency band, including at least one of frequencies f(1), f(2), f(3) and f(4), higher than a predetermined frequency, may be extracted to form the vibration waveform of the in-cylinder pressure.

Preferably, the knock waveform model stored in memory 202 is the vibration waveform formed based on the pressure in the direction orthogonal to the central axis of the cylinder, sensed by in-cylinder pressure sensor 316. Specifically, the knock waveform model should preferably be formed by detecting, using in-cylinder pressure sensor 316, the vibration component of in-cylinder pressure at the side surface of the cylinder when knocking is forced by an experiment or the like, and extracting the vibrations of the frequency band including frequencies f(1), f(2), f(4) and f(5) corresponding to the first to fourth tangential modes using a band-pass filter or the like having such a gain characteristic as shown in FIG. 11B.

Figure 7:
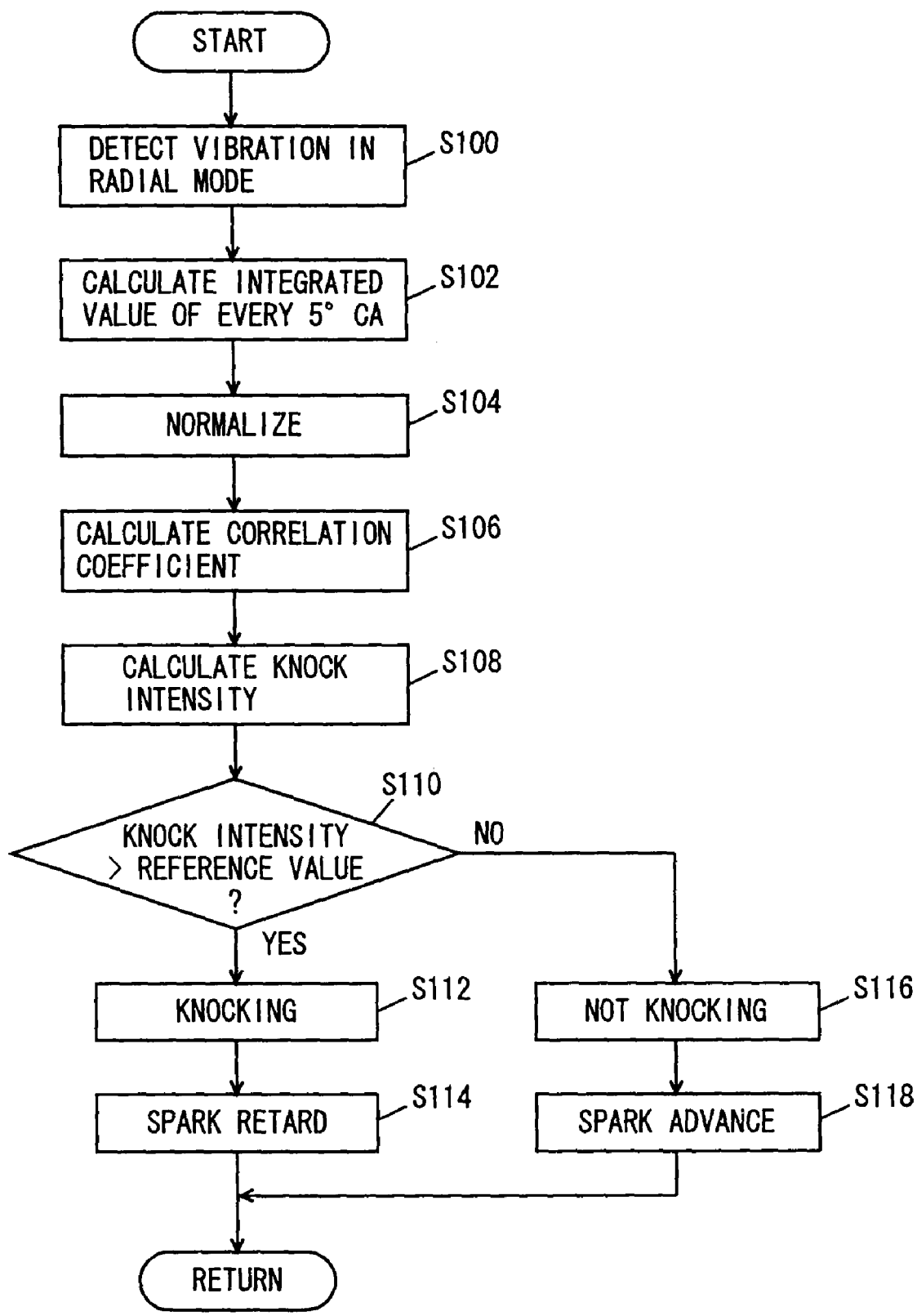
FIG. 7 is a flowchart illustrating a control structure of a program executed by the engine ECU as the knocking determination device in accordance with the first embodiment.
Figure 12:
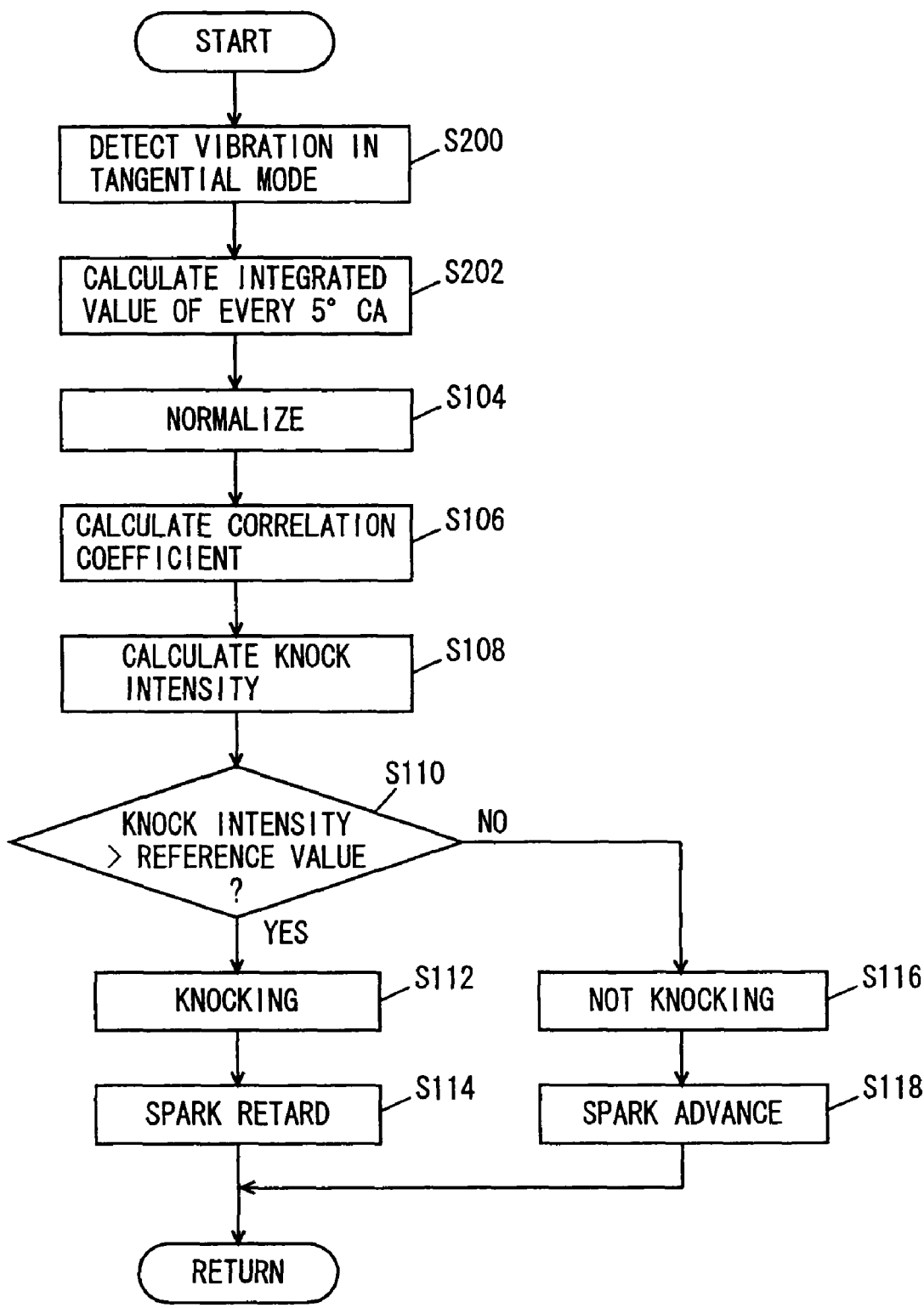
FIG. 12 is a flowchart illustrating a control structure of a program executed by the engine ECU as the knocking determination device in accordance with the second embodiment.

Referring to FIG. 12, the control structure of the program executed by engine ECU 200 in the knocking determination device in accordance with the present embodiment will be described. In the flow chart of FIG. 12, the same processes as those of FIG. 7 described above are denoted by the same step numbers. The process contents are the same. Therefore, detailed description thereof will not be repeated here.

At step S200, engine ECU 200 detects the magnitude of vibration in the tangential mode based on the in-cylinder pressure at the side surface of the cylinder of engine 100 from a signal transmitted from in-cylinder pressure sensor 316. Engine ECU 200 detects, from the vibration transmitted from in-cylinder pressure sensor 316, the magnitude of vibrations in the frequency bands that correspond to the first to fourth tangential resonance modes extracted by the band-pass filter. The vibration magnitude is represented by an output voltage value of in-cylinder pressure sensor 316. Note that the vibration magnitude may be represented by a value corresponding to the value of the voltage output from in-cylinder pressure sensor 316. The vibration magnitude is detected in a combustion stroke for an angle from a top dead center to (a crank angle of) 90°.

At S202, engine ECU 200 calculates, for a crank angle of every five degrees, an integration (hereinafter also be referred to as an "integrated value") of values of voltage output from in-cylinder pressure sensor 316 (i.e., representing magnitude of vibration). The integrated value is calculated for respective frequency bands that correspond to the first to fourth tangential resonance modes. The calculated integrated values are synthesized, and the vibration waveform of engine 100 is formed.

An operation of engine ECU 200 of the knock determination device according to the present embodiment based on the above-described configuration and flowchart will be described.

When a driver turns on ignition switch 312 and engine 100 starts, vibration magnitude of engine 100 is detected from a signal transmitted from in-cylinder pressure sensor 316 (S200).

In a combustion stroke for a range from the top dead center to 90°, an integrated value for every five degrees is calculated for vibrations in the frequency bands of first to fourth tangential resonance modes (S102), and the calculated integrated values are synthesized.

As an integrated value for every five degrees is used to detect a vibration waveform, it becomes possible to detect a vibration waveform of which delicate variations are suppressed. This makes it easier to compare a detected vibration waveform with the knock waveform model.

Each of the integrated values is divided by the maximum integrated value, to normalize the waveform (S104), to enable comparison between the vibration waveform and the knock waveform model. By the normalization, vibration magnitude in the vibration waveform is represented by a dimensionless number of 0 to 1. Thus, the detected vibration waveform can be compared with the knock waveform model regardless of the vibration magnitude. This can eliminate the necessity of storing a large number of knock waveform models corresponding to the magnitude of vibration and thus, facilitates preparation of the knock waveform model.

A timing of a normalized vibration waveform providing a vibration maximized in magnitude and that of a knock waveform model providing a vibration maximized in magnitude are matched, while a deviation in absolute value $\Delta S(I)$ between the normalized vibration waveform and the knock waveform model is calculated for each crank angle. Sum $\Sigma \Delta S(I)$ of $\Delta S(I)$ and the value S representing a magnitude of vibration in knock waveform model that is integrated by crank angle are used to calculate the coefficient of correlation $K=(S-\Sigma\Delta S(I))/S$ (S106). This allows numerical representation of a degree of matching between the detected vibration waveform and the knock waveform model, and hence allows objective determination.

The product of the coefficient of correlation K calculated in this manner and the largest integrated value P is divided by the BGL to calculate knock intensity N (S1108). Thus, whether the vibration of engine 100 is attributed to knocking can be analyzed in greater detail, using vibration magnitude in addition to the degree of matching between the detected vibration waveform and the knock waveform model.

If knock intensity N is larger than a predetermined reference value (YES at S110), a determination is made that engine knocks (S112), and a spark retard is introduced (S114) to suppress knocking.

If knock intensity N is not larger than the predetermined reference value (NO at S110), a determination is made that the engine does not knock (S116), and a spark advance is introduced (S118).

As described above, in the knocking determination device in accordance with the present embodiment, the in-cylinder pressure sensor is provided at the side surface of the cylinder, and detects vibration components that correspond to the first to fourth tangential resonance modes in the engine cylinder. As the in-cylinder pressure sensor is provided at the position that corresponds to the first to fourth tangential resonance modes, the vibration of internal combustion engine that is much influenced by the vibrations in the frequency bands of first to fourth tangential resonance modes can be detected. Based on the detected vibration, engine ECU 200 determines whether knocking occurred in the engine or not. As the vibrations in the frequency bands corresponding to the first to fourth tangential resonance modes are extracted, it is possible to remove noise other than knocking from the detected vibrations and to detect with high accuracy the vibration particular to knocking.

Further, the knock waveform model is the synthesized wave of vibration waveforms of the frequency bands that correspond to the first to fourth tangential resonance modes. By comparing the knock waveform model with the detected waveform, whether knocking occurred or not is determined. Thus, whether or not the engine knocks can be determined based not only on the magnitude of vibration but also on the timing at which vibration occurs. As a result, a knocking determination device that can accurately determine whether the knocking occurs or not in the internal combustion engine can be provided.

Though the vibration components of the frequency bands corresponding to first to fourth tangential resonance modes are sensed by the in-cylinder pressure sensor in the present embodiment, use of the in-cylinder sensor is not limiting. Specifically, in the first embodiment described above with reference to FIG. 4C, the vibration characteristic of in-cylinder pressure at the side surface of the cylinder tends to match the vibration characteristic of the cylinder block of engine 100. Therefore, vibrations of the frequency bands corresponding to first to fourth tangential resonance modes may be extracted from the vibrations of the cylinder block of engine 100 sensed by knock sensor 300, and based on the extracted vibrations, whether knocking occurred or not may be determined.

The vibrations sensed by knock sensor 300 may include various mechanical noises generated by the engine operation in various frequency bands. By extracting vibrations corresponding to first to fourth tangential resonance modes, however, it becomes possible to extract vibration particular to knocking. Therefore, from the detected vibrations, the vibration particular to knocking can be detected with high accuracy. Hence, it becomes possible to detect whether knocking occurred in the internal combustion engine or not, with high accuracy. Preferably, the knock waveform model should also be a vibration waveform that is formed based on the vibration sensed by knock sensor 300. Specifically, it is preferred that the knock waveform model is formed by extracting the vibrations of the frequency bands corresponding to first to fourth tangential modes from the vibrations sensed by knock sensors 300, by using band-pass filter or the like. In this manner, vibration particular to knocking can be detected with high accuracy from the detected waveforms.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A knocking determination device for an internal combustion engine, comprising:
    a waveform detecting unit that detects a vibration waveform of a frequency band corresponding to a radial mode as a resonance mode of combustion pressure propagation in a cylinder of said internal combustion engine;
    a storage unit that stores in advance a vibration waveform of the frequency band corresponding to said radial mode; and
    a determining unit that determines whether knocking occurred in said internal combustion engine or not, based on a result of comparison between said detected waveform and said stored waveform,
    wherein the vibration waveform stored in advance by the storage unit is a knock waveform model corresponding to a knocking state of said internal combustion engine,
    wherein the comparison is between the detected waveform after the detected waveform has been normalized, and the vibration waveform stored in advance has a magnitude represented by a dimensionless number ranging from 0 to 1, and
    wherein the determining unit calculates a coefficient of correlation K corresponding to a deviation between the normalized vibration waveform and the knock waveform model.

2. The knocking determination device according to claim 1, wherein
    said stored waveform is a vibration waveform based on pressure at an upper central portion in the cylinder of said internal combustion engine.

3. The knocking determination device according to claim 1, wherein
    said stored waveform is a waveform obtained by said waveform detecting unit provided on said internal combustion engine.

4. A knocking determination device for an internal combustion engine, comprising:
    waveform detecting means for detecting a vibration waveform of a frequency band corresponding to a radial mode as a resonance mode of combustion pressure propagation in a cylinder of said internal combustion engine;
    storage means for storing in advance a vibration waveform of the frequency band corresponding to said radial mode; and
    determining means for determining whether knocking occurred in said internal combustion engine or not, based on a result of comparison between said detected waveform and said stored waveform,
    wherein the vibration waveform stored in advance by the storage means is a knock waveform model corresponding to a knocking state of said internal combustion engine,
    wherein the comparison is between the detected waveform after the detected waveform has been normalized, and the vibration waveform stored in advance has a magnitude represented by a dimensionless number ranging from 0 to 1, and
    wherein the determining means calculates a coefficient of correlation K corresponding to a deviation between the normalized vibration waveform and the knock waveform model.

5. The knocking determination device according to claim 4, wherein
    said stored waveform is a vibration waveform based on pressure at an upper central portion in the cylinder of said internal combustion engine.

6. The knocking determination device according to claim 4, wherein
    said stored waveform is a waveform obtained by said waveform detecting unit provided on said internal combustion engine.

7. The knocking determination device according to claim 1, wherein the waveform detecting unit detects an in-cylinder pressure.

8. The knocking device according to claim 1, wherein the deviation, in absolute value, between the normalized vibration waveform and the knock waveform model is calculated for a plurality of crank angles, and the coefficient of correlation K is established by the relation $$K=(S-\Sigma \Delta S(I))/S$$

where S represents a magnitude of vibration in knock waveform model that is integrated by crank angle, $\Delta S$ is the deviation in absolute value between the normalized waveform and the knock waveform model for a crank angle I.

9. The knocking determination device according to claim 1, comprising an in-cylinder pressure transducer disposed on a side surface of a cylinder of the internal combustion engine.

10. The knocking determination device according to claim 1, wherein the vibration waveform model stored in advance corresponds to vibrations extracted that correspond to a resonance mode.

11. The knocking determination device according to claim 10, wherein the waveform model stored in advance spans a combustion stroke from a crank angle at top dead center to a crank angle of 90°.

* * * * *